July 6, 1965 K. FEDERN ETAL 3,192,775
DRIVE FOR ROTATING WORKPIECES, PARTICULARLY
FOR BALANCING MACHINES
Filed March 21, 1962 3 Sheets-Sheet 1

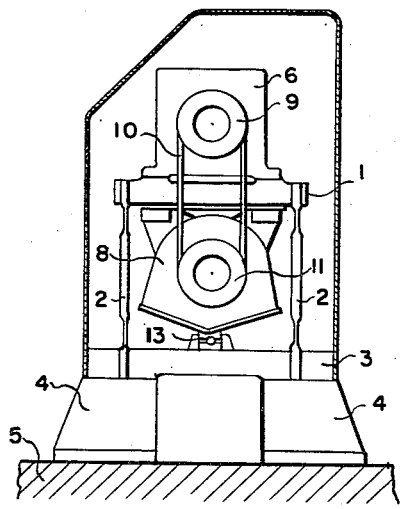
FIG. 2
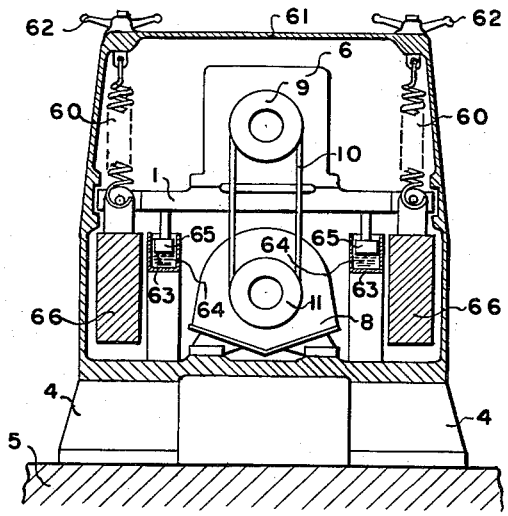
FIG. 6
FIG. 7
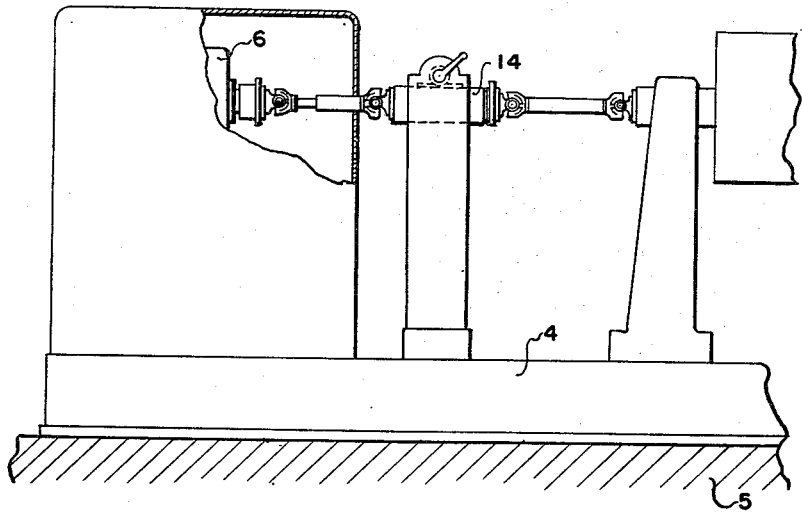

United States Patent Office 3,192,775
Patented July 6, 1965

3,192,775
DRIVE FOR ROTATING WORKPIECES, PARTICULARLY FOR BALANCING MACHINES
Klaus Federn and Carl Ohly, Darmstadt, Germany, assignors to Carl Schenck Maschinenfabrik G.m.b.H., Darmstadt, Germany, a corporation of Germany
Filed Mar. 21, 1962, Ser. No. 181,489
Claims priority, application Germany, Mar. 22, 1961, Sch 29,422
5 Claims. (Cl. 73—460)

Our invention relates to drives for rotating bodies, particularly rotating workpieces in balancing machines.

In the known balancing machines, the drive for rotating the workpiece, usually an electric motor with a speed-change transmission, is stiffly supported on the rigid foundation or bed structure of the machine. This is satisfactory at the relatively low operating speeds heretofore customary. With more exacting requirements as to increased operating speeds of the workpieces to be balanced or tested, the necessary driving power increases to a very considerable extent. For workpieces with windage losses the driving torque increases with the third power of the speed and the power demand increases with the fourth power of the speed. This requires correspondingly heavier and larger drive units. A further enlargement in power rating and size of the drives for high-speed balancing machines is needed for preventing the start-up period, this being the time for accelerating the workpiece to the testing speed, from being prolonged in proportion to the increase in speed. Such enlargement of the drives augments the driving masses that participate in acceleration and rotation during testing or balancing operation. The large masses may affect the balancing operation, particularly the attainable quality of measurement. Due to inevitable machining tolerances, those components of the drive that rotate at the speed of the workpiece, tend to excite vibrations at the rotation frequency to an extent which, because of the increased mass, is no longer negligible. Although the electric filter components of balance measuring equipment, particularly those on a wattmetric principle, eliminate disturbing vibrations as to their effect upon the unbalance measurement, they fail to have such filtering action upon disturbing vibrations whose frequency coincides with that of the rotation frequency of the workpiece. For that reason the vibrations stemming from the drive and occurring at the rotation frequency may falsify the result of the unbalance measuring operation.

It has been attempted to eliminate the effects of the drive upon the unbalance measurement by accelerating the workpiece to a speed above the one at which the unbalance measurement is to be performed, and then disconnecting the drive from the workpiece and measuring the unbalance while the workpiece is coasting at the desired speed. While this permits eliminating the effect of the drive upon the unbalance measurement to a great extent, an unbalance measurement of this kind is excessively time-consuming because, after the workpiece is uncoupled, it is necessary to wait until it coasts down to lower speed. It is also difficult to accurately determine the unbalance at the desired speed in this manner. Before accelerating the workpiece for performing a new unbalance measurement, the drive must again be coupled with the workpiece, so that the drive and the workpiece must either be arrested or additional expedients must be resorted to for securing a synchronous run during coupling operation.

It is an object of our invention to eliminate the above-mentioned shortcomings of the known balancing-machine drives and their detrimental effect upon the measuring result.

More specifically, it is an object of our invention to afford using heavy drive motors and transmissions of high power rating as desirable for operation at high rotational speeds of the workpiece, but to avoid or greatly minimize detrimental effects of rotating drive components upon the accuracy of measurement, without necessitating the use of complicated synchronizing equipment or demanding more operating time than normally needed for testing operations at lower speeds.

According to a feature of our invention we achieve these objectives by giving those components of the drive that rotate at the same speed as the workpiece such a mounting that these components are isolated in vibratory respects from the rotating workpiece in the direction in which the unbalance measurement is being performed. More specifically, aside from providing the balancing or other vibratory testing machine with workpiece accommodating means that are vibratorily supported on the rigid frame or bed structure of the machine, we mount the driving portion of the machine, such as an electric motor or an appertaining transmission or both, on a separate support which is likewise vibratorily secured to the frame or bed structure of the machine independently of the workpiece accommodating means, and we particularly support those drive components that couple the drive with the vibratorily rotating workpiece, in such a manner that no vibrations are transmitted from the driving portion of the machine to the workpiece-accommodating portion in the measuring direction, this direction being the one in which the workpiece accommodating means are capable of responding to workpiece unbalance by performing a vibratory motion which is utilized, for example by means of electric transducers, to measure the amount and angular position of unbalance.

By virtue of such a vibratorily isolated support of those drive components that rotate in synchronism with the workpiece, any unbalance inherent in these drive components is prevented from impairing the measuring results. Above all, such an isolation of the synchronous components of the drive affords the balancing of workpieces at speeds that are upwardly limited only by the forces acting upon the bearings. It has been attempted in known balancing machines to avoid the unbalances in the drive from affecting the unbalance measurement by setting the resonance speed of the drive as high as possible. This, however, puts an upward limitation upon the permissible rotational speed during the testing run in order to keep away from interference regions, and it also requires changing the mounting of the drive at the higher balancing speed, thus causing more difficulties at higher testing speeds. In this respect the invention, by virtue of the above-mentioned features, provides an effective remedy.

According to further features of our invention, the vibratorily isolated support of the drive is so designed that this support is stiff in the rotational direction of the workpiece so that the acceleration and braking torques can be unyieldingly taken up by the drive.

According to still another feature of the invention, the above-mentioned support is also made stiff in the axial direction in order to also take up any occurring displacement forces of the workpiece. An axially stiff journaling of the drive shaft, of advantage for balancing machines as well as for other machines in which similar forces are to be transmitted, is preferably secured, according to a further feature of our invention by having an outer bearing sleeve for an intermediate shaft in self-locking threaded engagement with a rotatable setting member by means of which an axial displacement can be effected and which secures the outer sleeve from inadvertent rotation.

According to still another feature of our invention further components of the drive, or preferably all components of the drive including those that do not rotate in synchronism with the workpiece but are connected with the drive motor by belt or gear transmissions, are likewise mounted on the machine frame or bed structure in vibratory isolation from the workpiece with respect to the measuring direction.

For extremely exacting requirements as to measuring accuracy and relative to particularly conditions in which excitation forces stemming from the drive but not extending in the measuring direction may become transmitted through the isolating support or other components in such a manner that they may generate vibrations of the workpiece in the measuring direction, it is further of advantage, according to still another feature of the invention, to mount the driving components so that they are also vibratorily isolated from the workpiece in the vertical direction. Since with such a mounting of the drive components, the torques are no longer rigidly taken up by the supporting means without special auxiliary means, we provide additional damping devices and/or pendulously suspended masses for increasing the dynamic stiffness in the peripheral direction.

The above-mentioned and more specific objects, advantages and features of our invention, said features being set forth with particularity in the claims annexed hereto, will be apparent from, and will be described in, the following with reference to the embodiments of machines according to the invention illustrated by way of example on the accompanying drawings in which:

FIG. 2 shows the same machine in a lateral view from the left of FIG. 1.

FIG. 6 is a side elevation, partly in section of still another machine; and FIG. 7 is a plan view, partly in section, of the same machine.

These same reference numerals are applied to corresponding elements respectively in all illustrations.

Figure 1:
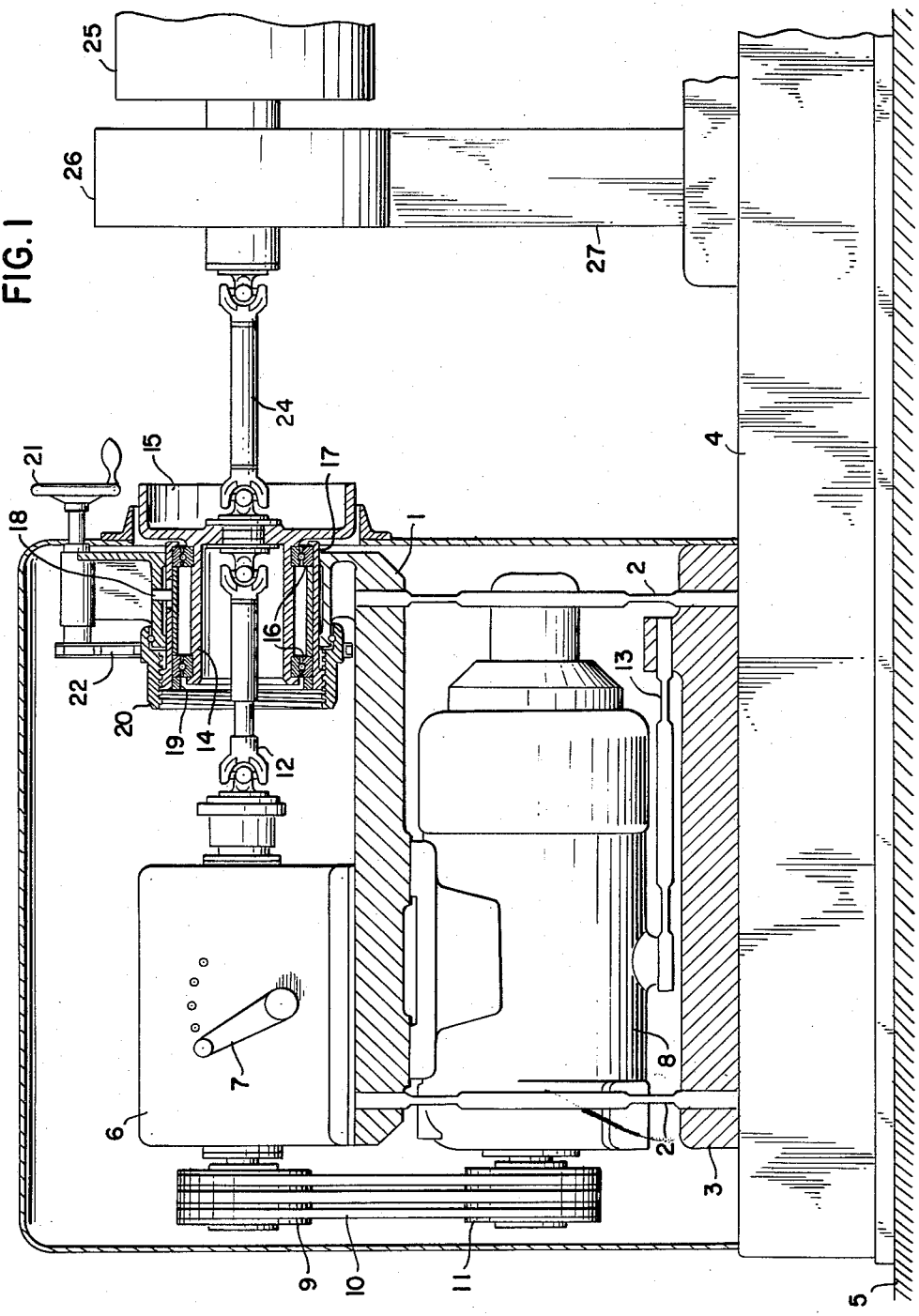
FIG. 1 is a part-sectional front view of the driving portion of a rotor balancing machine.

In the machine according to FIGS. 1 and 2 the drive is vibratorily supported so as to be isolated from the workpiece with respect to transmission of vibrations in the horizontal measuring direction.

An intermediate rigid frame 1 is supported by rod springs 2 of circular cross section on a foundation frame or plate 3 which is rigidly clamped to the bed structure 4 fixed to the foundation 5. An electric drive motor 8 is fastened to the intermediate frame 1. A rod spring 13 extending horizontally between the drive motor 8 and the foundation frame 3 prevents axial vibrations of the intermediate frame 1 and consequently of all drive components fastened to the frame 1. By virtue of the rod springs 2, however, the frame 1 and the drive components carried thereby can vibrate in other horizontal directions. The spring 13, of course may be attached to some other location, for example to the intermediate frame 1 itself.

The belt sheave 11 of the motor is connected with a belt sheave 9 of a speed-change gear transmission 6 by means of endless V-belts 10. The transmission 6 can be switched to a number of selective transmission ratios by means of a lever 7. The output shaft of the transmission 6 is connected by a universal joint with a telescopically extensible shaft 12 whose other end is connected by another universal joint with a longitudinally displaceable tubular shaft 14. Fastened to the intermediate shaft 14 is an indicator drum 15 which carries on its peripheral surface a scale of indicia. Such indicator drum is customarily used on balancing machines with a universal (articulated or Cardanic) driving shaft, and serves for finding the unbalance angular position of the rotor. The intermediate shaft 14 is journalled by a needle or a ball bearing 16 in a sleeve 17. One or more pins 18 are provided to prevent turning of the sleeve 17. One end of the sleeve 17 has an external screw thread 19 engaging an internal thread of a ring member 20. By turning the threaded member 20 with the aid of a hand wheel 21 through a chain transmission 22 or any other suitable transmission device, the threaded sleeve 17 can be displaced axially. The sleeve 17 and thereby the shaft 14 are thus shifted to the left or right depending upon the sense of rotation of member 20. The intermediate shaft 14 is likewise journalled in the intermediate frame 1. It is thus mounted in a vibratorily isolated manner relative to the workpiece 25 in the measuring direction. The shaft 14 is connected by a universal joint with a coupling shaft 24 which in turn is connected by a universal joint with the workpiece 25. The workpiece is mounted in conventional manner on journalling means schematically indicated in FIG. 1 as comprising a bearing portion 26 supported by leaf springs 27 on the bed structure 4 of the machine. These mounting means 2, 13 permit the workpiece 25 together with the bearing means 26 to perform vibratory motion in a horizontal plane due to any unbalance of the workpiece, such vibratory motion being at the frequency of the workpiece rotation during the measuring run. The horizontal vibration is sensed by suitable pickups or transducers and utilized for performing the unbalance measuring operation in any available known or conventional manner. Since this is not essential to the invention proper, the pickup and measuring means are not illustrated and not further described herein. In accordance with the horizontal measuring direction the isolation of the synchronous drive components, in oscillatory respects, is also effective in the horizontal direction. That is, if the components of the drive that run in synchronism with the workpiece during the measuring operation are affected by unbalance, any vibration caused by such unbalance within the drive assembly remains isolated from the workpiece and its independently supported bearing means and therefore cannot falsify the measuring results.

Figure 3:
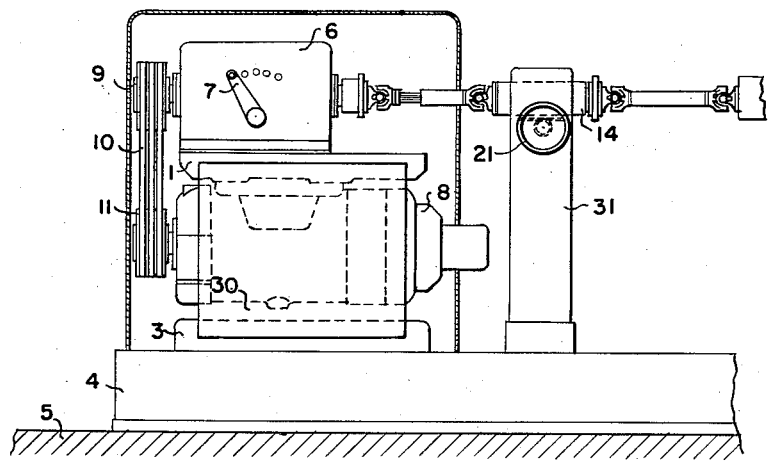
FIG. 3 is a front view of another driving portion for a balancing machine otherwise similar to that of FIG. 1.
Figure 4:
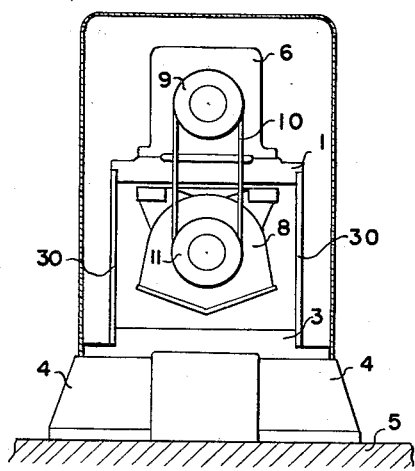
FIG. 4 is a side elevation from the left of FIG. 3.
Figure 5:
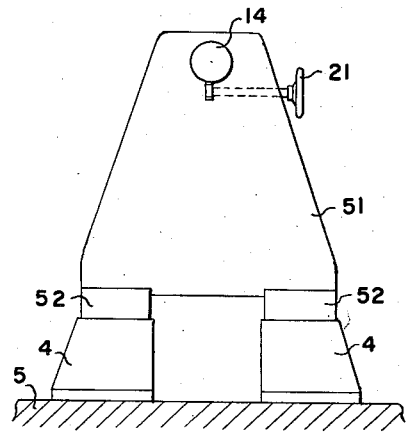
FIG. 5 shows the machine of FIG. 3 seen from the right but with a modified design of the illustrated components.

The embodiments shown in FIGS. 3, 4 and 5 have a design fundamentally similar to that described above with reference to FIGS. 1 and 2 so that it suffices to explain only the differences.

According to FIGS. 3 and 4, the extensible or longitudinally displaceable intermediate shaft 14 is mounted and supported on the bed structure 4 of the machine separately and independently of the drive motor and the appertaining transmission, and also separately and independently of the mounting means for accommodating the workpiece, the latter being not shown in FIG. 3 but similar to those represented in FIG. 1. The bearing for the intermediate shaft 14 comprises wide leaf springs 31 whose lower ends are firmly secured to the bed structure and whose upper ends are attached to the bearing. According to the modified design shown in FIG. 5, the extensible Cardanic shaft 14 has its bearing mounted on a trapezoidal standard 51 which is secured to the bed structure 4 by means of rubber springs so as to be vibratorily isolated from the bed structure. Other oscillation-damping elements can be used instead of the rubber springs 52.

In the embodiment according to FIGS. 3 and 4, the intermediate frame 1 is supported on the foundation frame 3 not by means of the round-rod springs 2 shown in FIGS. 1 and 2 but by means of leaf springs 30 of great width. These leaf springs 30 prevent axial displacement of the drive so that the additional rod springs 13 shown in FIGS. 1 and 2 is not necessary for this purpose.

In the machine according to FIGS. 6 and 7 the intermediate shaft 14 is mounted separately from the drive motor assembly, in a manner similar to the design described above with reference to FIGS. 3 to 5. The drive motor 8 is fastened to the bottom plate of a housing 61 whereas the transmission 6 is mounted on the intermediate frame 1 and connected by the belt drive 10 with the driving sheave 11 of the motor. The intermediate frame 1 is vibratorily suspended in housing 61 by means of springs 60. The pre-tension of the springs can be varied and adjusted by means of set screws 62. Rotational oscillations as a result of acceleration and braking torques are prevented by damping devices comprising two pistons 65 displaceable in respective cylinders 64 filled with liquid 63. Oscillatory motion about the axis of rotation is damped to a great extent by these damping devices. In addition, the machine is provided with pendulously suspended masses 66 for increasing the dynamic stiffness in the peripheral direction. The drive motor 8 may also be fastened on the intermediate frame as shown in FIGS. 1 to 4. On the other hand in the embodiments of FIGS. 1 to 5 the drive motor need not necessarily be fastened to the intermediate frame but may also be mounted on the foundation frame 3 in accordance with FIG. 6.

From the foregoing it is apparent that it is the vibrations from the motor transmitted through the base to the workpiece support that are obviated by the disclosed structure, as well as those from the motor through the drive to the workpiece support.

Such and other modifications and variations will be obvious to those skilled in the art upon a study of this disclosure and are indicative of the fact that our invention can be given embodiments other than particularly illustrated and described herein, without departing from the essential features of the invention and within the scope of the claims annexed hereto.

We claim:
1. A drive for rotating workpieces in vibratory testing machines, particularly balancing machines, comprising a rigid machine structure, workpiece-journalling support means vibratorily mounted on said structure and capable of vibratory motion in a given measuring direction, an intermediate rigid frame, spring means vibratorily mounting said frame on said machine structure independently of and spaced from said support means, an electric drive motor and a transmission connected to said motor, said motor and transmission being fastened to said frame, and coupling means for drivingly connecting said transmission with the workpiece to rotate the latter, said coupling means being vibratorily isolated from the support means relative to said measuring direction, said coupling means having parts whose rotary speed is synchronous with the workpiece rotation, said spring means comprising rods supporting said parts relative to said machine structure so as to permit vibratory movement of said parts separately from the workpiece in said measuring direction.

2. A drive for rotating workpieces in vibratory testing machines, particularly balancing machines, comprising a rigid machine structure, workpiece-journalling support means vibratorily mounted on said structure and capable of vibratory motion in a given measuring direction, a drive assembly having a coupling portion for transmitting rotary motion to the workpiece and a driving portion comprising a motor and transmission means connecting said motor with said coupling portion, and spring means vibratorily mounting said driving portion on said structure independently of said support means so as to vibratorily isolate said driving portion from said support means so as to permit independent movement of said driving portion in a plane defined by said axis and said measuring direction, said spring means joining said drive assembly with said machine structure, and frictional vibration damping means connected parallel to said spring means for damping the vibrations of said drive assembly.

3. A drive according to claim 2, comprising additional weighting means and springs joined with said driving assembly and forming an oscillatory system for increasing the vibratory stiffness of the assembly.

4. A drive for rotating workpieces in vibratory testing machines, particularly balancing machines, comprising a rigid machine structure, workpiece-journalling support means vibratorily mounted on said structure and capable of vibratory motion in a given measuring direction, a drive assembly having a coupling portion for transmitting rotary motion to the workpiece and a driving portion comprising a motor and transmission means connecting said motor with said coupling portion, and spring means vibratorily mounting said driving portion on said structure independently of said support means so as to vibratorily isolate said driving portion from said support means so as to permit independent movement of said driving portion in a plane defined by said axis and said measuring direction, said coupling portion comprising a telescopically expansible and rotationally stiff Cardanic shaft for transmission of driving power to the workpiece, an intermediate tubular shaft surrounding said Cardanic shaft and joined therewith in substantially co-axial relation to rotate together therewith, an outer sleeve in which said intermediate shaft is revolvable, a rotatable screw-nut member coaxially around said sleeve and in self-locking threaded engagement therewith, and means for turning and locking said member to thereby axially shift said sleeve with said two shafts for varying the active length of said Cardanic shaft.

5. A drive for rotating workpieces in vibratory testing machines, particularly balancing machines, comprising a rigid machine structure, workpiece-journalling support means vibratorily mounted on said structure and capable of vibratory motion along a given axis in a given measuring direction, a drive assembly having a coupling portion for transmitting rotary motion to the workpiece and a driving portion comprising a motor and transmission means connecting said motor with said coupling portion, and spring means vibratorily mounting said driving portion on said structure independently of said support means so as to vibratorily isolate said driving portion from said support means so as to permit independent movement of said driving portion in a plane defined by said axis and said measuring direction, and vibration damping means between said drive assembly and said machine structure for damping rotational oscillations of said drive assembly.

References Cited by the Examiner
UNITED STATES PATENTS

| | | | |
|---|---|---|---|
| 2,186,339 | 1/40 | Moore | 73—478 |
| 2,331,160 | 10/43 | Baker et al. | 73—471 |
| 2,426,305 | 8/47 | Hope | 73—465 |
| 2,449,563 | 9/48 | Minoisky | 73—465 |
| 2,722,830 | 11/55 | Federn et al. | 73—463 |
| 2,783,648 | 3/57 | Stovall et al. | 73—462 |
| 2,947,172 | 8/60 | King | 73—462 |
| 3,034,361 | 5/62 | Karpchuk | 73—466 |

RICHARD C. QUEISSER, Primary Examiner.

ROBERT L. EVANS, JAMES J. GILL, Examiners.